United States Patent Office

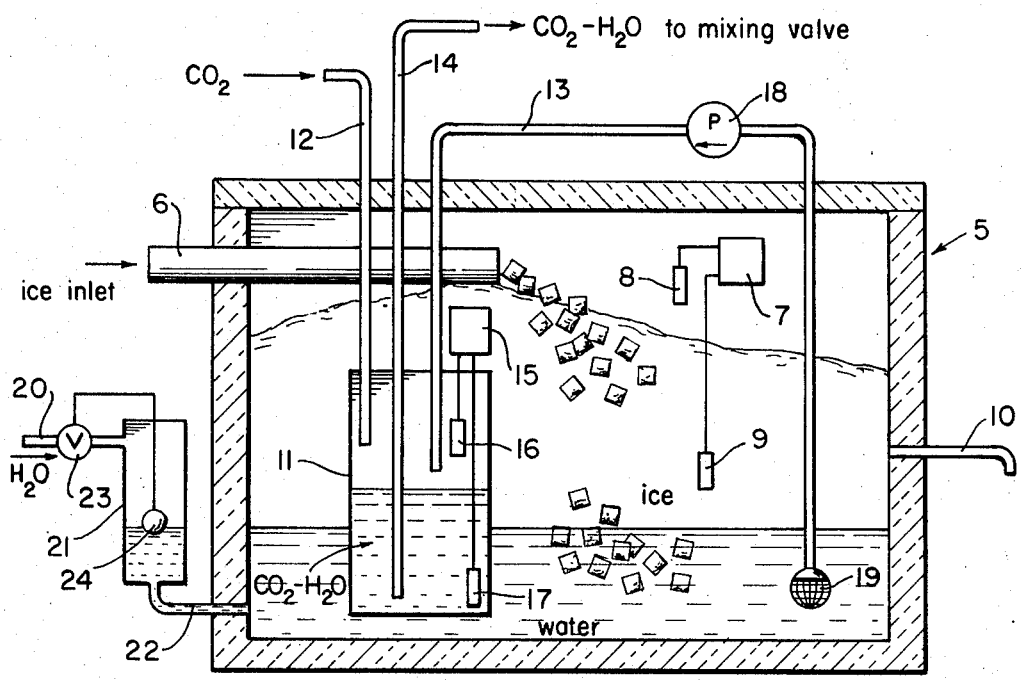

3,721,369
Patented Mar. 20, 1973

3,721,369
ICE STORAGE AND WATER CARBONATING
SYSTEM
Robert F. Conti and Don S. Follett, Easton, Pa., assignors to Follett Corporation
Filed Dec. 28, 1970, Ser. No. 101,553
Int. Cl. B67d 5/08
U.S. Cl. 222—67                                    6 Claims

ABSTRACT OF THE DISCLOSURE

This invention is directed to an ice storage and water carbonating system that includes a water carbonating vessel located within an ice storage chest. Carbon dioxide under pressure and make-up water are supplied to the carbonating vessel. The make-up water is drawn from the bottom of the storage chest and includes melt water from the ice therein plus any amount of externally supplied water that may be required beyond that solely available from the melt water. Suitable controls are provided to maintain the ice, water and carbonated water levels within predetermined ranges.

---

This invention relates generally to new and useful improvements in heat exchangers for beverages and particularly seeks to provide a novel ice storage system that includes means for forming, cooling and dispensing carbonated water in a post-mix carbonated beverage system.

In post-mix beverage dispensers, carbonated water and a dispensing syrup normally are both precooled and fed separately to a mixing valve or faucet from which the carbonated beverage is dispensed. The temperature of the dispensed drink preferably should be no warmer than about 40° F. in order to avoid an undesirable loss of carbonation.

In such systems, the carbonated water is made by spraying water into a tank containing carbon dioxide ($CO_2$) under about 100 p.s.i.g. pressure. It is desirable to obtain a minimum of 4.0 volumes of $CO_2$ gas absorbed into the water in order to reach the minimum acceptable quality of the carbonated water, which quality increases as the volume of absorbed $CO_2$ gas increases. Increased absorption of the $CO_2$ gas into the water may be achieved by increasing the pressure of the gas and/or by lowering the temperature of the water. The following table is illustrative:

TABLE I

| Pressure: | Temp., °F. | Vol. $CO_2$/ vol. $H_2O$ |
|---|---|---|
| 100 | 80 | 5.60 |
| 100 | 40 | 11.29 |
| 30 | 80 | 2.2 |
| 30 | 40 | 4.3 |

Therefore, if the water is cooled before it enters the carbonator, either less pressure is required to get the same volume of gas into the water or more gas can be absorbed by the water at the original pressure.

This result readily may be obtained through the use of this invention in which the carbonator tank is placed in an ice filled storage tank for cooling and the clean melt water from the ice, which is at about 32° F., is used as part of the make-up water for the system instead of being discarded as in the past. Such use of the melt water is possible because it is as clean as the uncontaminated water from which the ice was originally made in an icemaker.

Furthermore, heat losses are sharply reduced, since it is no longer necessary to precool the beverage syrup by the use of coils in the cooler and it is no longer necessary to maintain the water in the cooler under constant or near constant circulation.

Therefore, an object of this invention is to provide a novel system for forming, cooling and dispensing carbonated water.

Another object of this invention is to provide a system of the character stated in which a water carbonating vessel is located within an ice storage chest whereby constantly to maintain the carbonating vessel and its contents at about the melting temperature of fresh water ice.

Another object of this invention is to provide a system of the character stated in which cold melt water from the ice in the storage chest is used as at least part of the make-up water for the carbonating vessel.

Another object of this invention is to provide a system of the character stated in which additional make-up water may be supplied to the bottom of the ice storage chest and prechilled by exposure to the lower portion of the ice therein and by being intermixed with the cold melt water prior to admission to the carbonating vessel.

A further object of this invention is to provide a system of the character stated in which the amount of ice in the storage chest is maintained within predetermined limits by a suitable bin level control, the level of the make-up water in the bottom of the storage chest is maintained within predetermined limits by suitable controls operably associated with the intake for the additional make-up water, and the level of the carbonated water in the carbonating vessel is similarly maintained within predetermined limits by suitable controls operably associated therewith.

A still further object of this invention is to provide a system of the character stated that is simple in design, rugged in construction, reasonable in manufacturing cost and economical to operate and maintain.

With these and other objects, the nature of which will be apparent, the invention will be more fully understood by reference to the drawing, the accompanying detailed specification and the appended claims.

The sole figure of the drawing is a somewhat schematic longitudinal section of an ice storage and water carbonating system constructed in accordance with this invention.

Referring to the drawing in detail the invention, as illustrated, is embodied in an ice storage and water carbonating system that includes an insulated ice storage chest generally indicated 5 into the upper end of which a controlled free flow of cubed or flaked ice may be delivered, through a pipe 6, from any suitable ice making machine. The level of ice in the chest 5 is controlled within predetermined limits by a bin level unit 7 provided with upper and lower sensors 8 and 9, respectively. An overflow drain 10 is positioned part way up one wall of the chest 5 to permit discharge of melt or make-up water in the event that other controls should not function in time to prevent their flow to be shut off earlier and to provide an adequate volume of water within the storage chest for cleaning operations when the unit may be shut down for that purpose. Obviously, for cleaning purposes a drainage sump (not shown) and shut-off valve will be provided, as may be required.

A carbonating tank or vessel 11 is affixed within the chest 5 in a position at which most, if not all, of it is covered by the ice in the chest.

The carbonating tank 11 is supplied with carbon dioxide ($CO_2$) gas under pressure through a pipe 12, make-up water through a pipe 13 and the resultant carbonated water is dispensed through a discharge pipe 14 which leads to the usual mixing or dispensing valve (not shown) at the ultimate point of service.

A level control unit 15, having upper and lower sensors 16 and 17, respectively, maintains the volume of carbonated water in the vessel 11 within a predetermined range.

Under conditions of low demand for carbonated water at the ultimate dispensing station, it is possible that the melt water from the ice in the chest 5 is adequate to supply the demand to the carbonator. For this purpose, a pump 18 has its intake located within the zone of melt water at the bottom of the chest 5 and draws water therefrom through a screened inlet 19 which prevents any solid particles of ice from entering the pump.

However, it is more likely that the demand for carbonated water from the vessel 11 will exceed that that can be supplied solely through use of the melt water. Accordingly, means are provided for an external source of additional make-up water that include a water supply pipe 20 connected to a level control tank 21 that discharges through a pipe 22 into the bottom portion of the chest 5. A valve 23, actuated by a float or other sensor 24 in the tank 21, controls admission of water into the chest 5 and, through the sensor 24, controls the general range of water level in the bottom of the storage chest.

It will, of course, be understood that the vertical positioning of the tank 21 and the control range of the sensor 24 will be such that the depth range of water in the bottom of the chest 5 will be maintained within predetermined limits even though part of the make-up water is supplied by melt water in the bottom of the chest.

It should also be noted that any make-up water supplied through the pipe 22 automatically will become prechilled because it will contact the ice in the lower portion of the chest 5 and will become intermixed with the cold water in the bottom of the chest before being drawn into the screened inlet 19 of the pump 18.

Based on the foregoing, it is believed that the construction, operation, objects and advantages of our present invention will be readily comprehended by persons skilled in the art, without further description. It is to be clearly understood, however, that various changes in the construction described above and illustrated in the drawing may be made without departing from the scope of the invention, it being intended that all matter contained in the description or shown in the drawing shall be interpreted as illustrative only and not in a limiting sense.

We claim:

1. In an ice storage and water carbonating system, an ice storage chest, means for supplying ice to the interior of the chest, a carbonating vessel located within the chest, means for supplying carbon dioxide under pressure to the interior of the carbonating vessel, means for supplying make-up water to the carbonating vessel from the bottom portion of the storage chest, at least part of the make-up water being melt water from ice supplied to the chest by the first-mentioned means, and means for discharging carbonated water from the carbonating vessel.

2. The ice storage and carbonating system of claim 1 additionally including means for supplying any required make-up water to the storage chest beyond that available as melt water from any ice contained within the storage chest.

3. The ice storage and carbonating system of claim 2 additionally including means responsive to changes in liquid level within the carbonating vessel for controlling the admission of make-up water thereto.

4. The ice storage and carbonating system of claim 3 additionally including means responsive to changes in water level within the storage chest for controlling the admission thereto of any make-up water that may be required beyond that available as melt water from any ice contained within the storage chest.

5. In an ice storage and water carbonating system, an ice storage chest, a carbonating vessel located within the chest, means for supplying carbon dioxide under pressure to the interior of the carbonating vessel, means for supplying make-up water to the carbonating vessel from the bottom portion of the storage chest, at least part of the make-up water being melt water from any ice contained within the storage chest, means for discharging carbonated water from the carbonating vessel, means responsive to changes in liquid level within the carbonating vessel for controlling the admission of make-up water thereto, and means responsive to changes in ice levels within the storage chest for controlling the admission of ice thereto.

6. In an ice storage and water carbonating system, an ice storage chest, a carbonating vessel located within the chest, means for supplying carbon dioxide under pressure to the interior of the carbonating vessel, means for supplying make-up water to the carbonating vessel from the bottom portion of the storage chest, at least part of the make-up water being melt water from any ice contained within the storage chest, means for discharging carbonated water from the carbonating vessel, means responsive to changes in liquid level within the carbonating vessel for controlling the admission of make-up water thereto, means responsive to changes in water level within the storage chest for controlling the admission thereto of any make-up water that may be required beyond that available as melt water from any ice contained within the storage chest, and means responsive to changes in ice levels within the storage chest for controlling the admission of ice thereto.

References Cited
UNITED STATES PATENTS

| | | | |
|---|---|---|---|
| 2,434,374 | 1/1948 | Tull | 261—Dig. 7 |
| 3,565,405 | 2/1971 | Black | 261—Dig. 7 |
| 3,209,952 | 11/1962 | Cornelius | 222—146 C X |
| 3,224,641 | 6/1964 | Morgan | 222—146 C X |

STANLEY H. TOLLBERG, Primary Examiner